US005740480A

United States Patent [19]

Kuhn, Jr. et al.

[11] Patent Number: 5,740,480
[45] Date of Patent: Apr. 14, 1998

[54] CAMERA WITH MOVABLE FIRST LENS COVER WHICH SUPPORTS MOVABLE SECOND LENS COVER WHICH OPENS DURING MOVEMENT OF FIRST LENS COVER

[75] Inventors: Robert L. Kuhn, Jr., Rush; Anna C. Schelling, Geneva; Robert D. Huot, Pittsford, all of N.Y.

[73] Assignee: Eastman Kodak Company, Rochester, N.Y.

[21] Appl. No.: 802,739

[22] Filed: Feb. 20, 1997

[51] Int. Cl.⁶ .................... G03B 29/00; G03B 15/03; G03B 17/00; G03B 17/04
[52] U.S. Cl. .................... 396/177; 396/287; 396/429; 396/448; 348/64; 358/906
[58] Field of Search .................... 396/177, 178, 396/201–204, 281, 287–292, 348, 349, 350, 429, 432, 448; 348/64, 333, 334; 358/906

[56] References Cited

U.S. PATENT DOCUMENTS

| | | | |
|---|---|---|---|
| 3,504,605 | 4/1970 | Scudder et al. | 95/11 |
| 4,181,415 | 1/1980 | Uchiyama et al. | 354/86 |
| 4,283,132 | 8/1981 | Engelsmann et al. | 396/448 |
| 4,319,818 | 3/1982 | Sawara | 354/145 |
| 4,350,420 | 9/1982 | Engelsmann et al. | 354/145 |
| 4,557,571 | 12/1985 | Reibl | 354/149.11 |
| 4,589,747 | 5/1986 | Nakayama et al. | 354/149.11 |
| 4,601,562 | 7/1986 | Yoneyama et al. | 354/170 |
| 4,714,962 | 12/1987 | Levine | 358/209 |
| 4,742,369 | 5/1988 | Ishii et al. | 354/441 |

*Primary Examiner*—Howard B. Blankenship
*Attorney, Agent, or Firm*—Charles E. Snee, III

[57] ABSTRACT

A hybrid camera (10) includes a camera housing (12); a first taking lens (16) for film photography; a second taking lens (18) for digital photography; a first lens cover (14) for movement between a first position in which one of the first and second lenses is covered by the first lens cover and a second position in which the one lens is uncovered by the first lens cover; a first aperture (20) in the first lens cover for revealing the other of the first and second lenses in the second position; a second lens cover (22, 90) supported by the first lens cover for movement between a third position in which the first aperture is covered by the second lens cover and a fourth position in which the first aperture is uncovered by the second lens cover to reveal the other lens in the second position; and a mechanism (74–84; 92–104) actuated by movement of the first lens cover to move the second lens cover between the third and fourth positions. A status display panel (30) is raised and lowered with the first lens cover to position the status display panel to be viewed easily at the same time as an image display panel (126) on the back of the camera.

36 Claims, 7 Drawing Sheets

CAMERA WITH MOVABLE FIRST LENS COVER WHICH SUPPORTS MOVABLE SECOND LENS COVER WHICH OPENS DURING MOVEMENT OF FIRST LENS COVER

DESCRIPTION

1. Technical Field

The invention concerns photographic cameras. More particularly, the invention relates to a camera having an integral lens cover movable between positions covering and revealing lenses of the camera.

2. Background of the Invention

Cameras are known which include a movable portion to cover or reveal a taking lens and a viewfinder lens. For example, U.S. Pat. Nos. 4,589,747 and 4,601,562 each disclose a camera in which a flash unit is incorporated in an integral lens cover which moves horizontally between a closed position in which both the taking lens and the viewfinder lens are covered and an open position in which the lenses are revealed and the flash unit is deployed. The lens covers disclosed in these patents are particularly suited for conventional film or digital cameras in which a relatively short stroke of a single lens cover is sufficient to cover or reveal both lenses. Since the flash units are deployed horizontally, asymmetrical illumination of objects in a scene can occur, which may produce unsatisfactory photographic prints.

In some types of cameras, however, the lenses may be separated sufficiently that such prior art lens covers become unsuitable, particularly if the flash unit is to be deployed with the lens cover. Hybrid cameras have a first, film mode in which images are captured on conventional photographic film; a second, digital mode in which images are captured by an electronic imaging device; and a third, hybrid mode in which images are captured on film and by an electronic imaging device. U.S. Pat. Nos. 4,714,962 and 4,742,369 disclose hybrid cameras in which parallel optical systems are used independently for the digital and film modes and essentially simultaneously for the hybrid mode. A third, parallel optical system may be included for a viewfinder. Stereo cameras have a similar arrangement. Thus, hybrid or stereo cameras may include as many as three parallel optical systems to be covered or revealed in use of the camera, plus a flash to be deployed. A simple, movable lens cover of the type known in the prior art would be expected to require a rather long stroke or complex shape to be able to cover or reveal lenses separated by substantial distances.

Cameras also are known which include electronic status displays to indicate settings or conditions of various parts of the camera or characteristics of a scene to be photographed. Such displays typically have been located in various places on either a back surface or a top surface of a housing of the camera. Thus, the displays are not always conveniently placed for a user of a camera to consult without reorienting the camera from a typical orientation for taking a picture. Hybrid cameras also are known which have a larger electronic image display panel for previewing or reviewing digitally captured images, such as a liquid crystal display (LCD). Such hybrid cameras could also include one of the known status display panels, though difficulty would be expected in locating both panels on the back or top of the camera, due to typical space constraints. Use of a hybrid camera with both types of displays would be simplified if the electronic status display and the electronic image display panel could be viewed with the camera in a single orientation, without having to tip the camera from back to top, for example, to enable the user to see the two types of displays. A need has existed for cameras with status and image display panels which can be more conveniently consulted by a user.

SUMMARY OF THE INVENTION

A primary objective of the invention is to provide an improved, integral lens cover for cameras having two or more parallel optical systems.

Another objective is to provide such a lens cover which is easy to use and will open or close with a minimum of movement.

A further objective is to provide a camera with a status display panel which moves from a lowered position to a raised, angled position to ease viewing of the status display and an image display panel.

Still another objective of the invention is to provide a camera with a lens cover which, as the lenses are revealed, not only deploys the flash unit, but also activates electronic control features of the camera and raises a status display panel.

These objectives are given only by way of illustrative examples; thus other desirable objectives and advantages inherently achieved by the disclosed invention may occur or become apparent to those skilled in the art. Nonetheless, the scope of the invention is to be limited only by the appended claims.

A hybrid camera in accordance with the invention may include a camera housing; a first taking lens supported by the housing for film photography; and a second taking lens supported by the housing for digital photography. A first lens cover may be supported by the housing for movement between a first position in which one of the first and second lenses is covered by the first lens cover and a second position in which the one lens is uncovered by the first lens cover. A first aperture may be provided in the first lens cover for revealing the other of the first and second lenses in the second position; and a second lens cover may be supported by the first lens cover for movement between a third position in which the first aperture is covered by the second lens cover and a fourth position in which the first aperture is uncovered by the second lens cover to reveal the other lens in the second position. A mechanism actuated by movement of the first lens cover is provided to move the second lens cover between the third and fourth positions A film or digital camera according to the invention may include a camera housing; a taking lens supported by the housing; and an objective lens for a viewfinder supported by the housing. A first lens cover may be supported by the housing for movement between a first position in which one of the taking and objective lenses is covered by the first lens cover and a second position in which the one lens is uncovered by the first lens cover. An aperture may be included in the first lens cover for revealing the other of the taking and objective lenses in the second position; and a second lens cover may be supported by the first lens cover for movement between a third position in which the aperture is covered by the second lens cover and a fourth position in which the aperture is uncovered by the second lens cover to reveal the other lens in the second position. A mechanism actuated by movement of the first lens cover is provided to move the second lens cover between the third and fourth positions.

A hybrid camera or a film or digital camera of the types described in the preceding two paragraphs may include a flash unit supported by the first lens cover. A camera status display panel may be pivotably supported by the housing for movement between a lowered position and a raised position; and a mechanism actuated by movement of the first lens cover may be included to raise the display panel as the first lens cover moves to the second position and to lower the display panel as the first lens cover moves to the first position. The hybrid camera also may include an objective lens for a viewfinder supported by the housing, the objective lens being covered by the first lens cover in the first position; and a second aperture in the first lens cover for revealing the objective lens in the second position. The mechanism to move the second lens cover may include a pivot supporting the second lens cover on the first lens cover; an engagement surface on the second lens cover spaced radially from the pivot; and an abutment member supported by the housing to contact the engagement surface as the first lens cover moves toward the second position, thereby causing the second lens cover to rotate about the pivot from the third position to the fourth position. Alternatively, the mechanism to move the second lens cover may include a first cam member in the housing; a second cam member in the first lens cover; a first cam follower extended from the second lens cover into engagement with the first cam member; and a second cam follower extended from the second lens cover into engagement with the second cam member.

A camera according to the invention may include a camera housing; a taking lens supported by the housing; a camera status display panel pivotably supported by the housing for movement between a lowered position and a raised position; a member supported by the housing for movement between a first position and a second position; and a mechanism actuated by movement of the member to raise the display panel as the member moves to the second position and to lower the display pane/as the member moves to the first position. When an image display panel is included on a back of the camera, the status display panel and the image display panel can be viewed together.

The invention provides various advantages. In a single movement of the lens cover, the taking lens(es) and viewfinder lens are revealed, electronic control features of the camera are activated, the status display panel is raised, and the flash unit is deployed. The status display panel and an image display panel on a back of the camera can be viewed at the same time. The status display panel and the lens cover cooperate in the raised position to provide a robust configuration. Since the flash unit is raised above the taking lens(es), more uniform, symmetrical lighting is possible. Operation of the lens cover is simple and intuitive for the user, who cannot see through the viewfinder until the lens cover is moved.

BRIEF DESCRIPTION OF THE DRAWINGS

The foregoing and other objectives, features and advantages of the invention will be apparent from the following more particular description of the preferred embodiments of the invention, as illustrated in the accompanying drawings.

DESCRIPTION OF THE PREFERRED EMBODIMENTS

Figure 1:
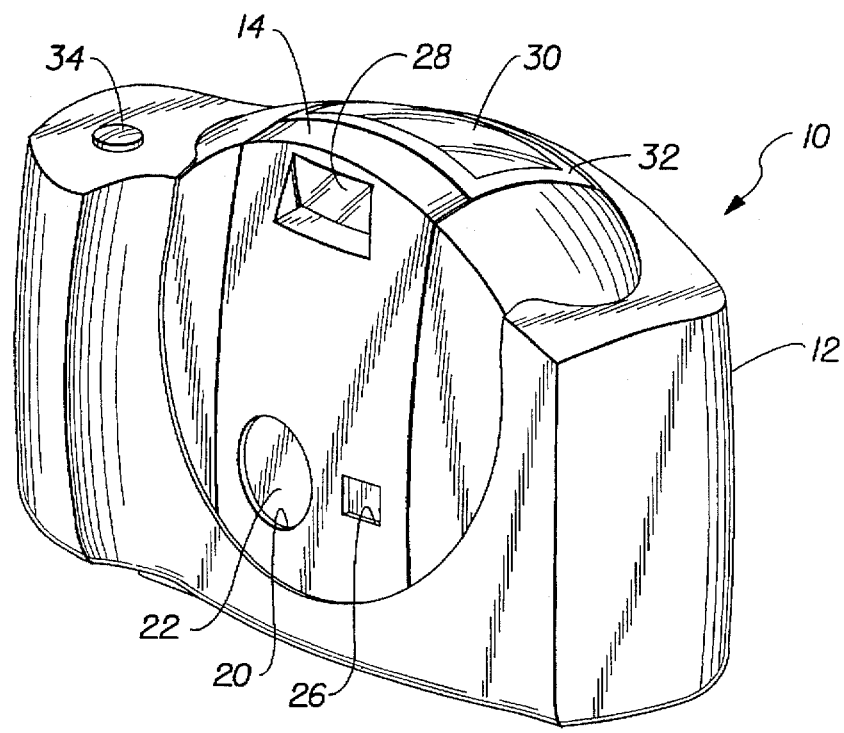
FIG. 1 shows a front perspective view of a hybrid camera including a lens cover in accordance with the invention, with the lens cover in a closed position.

The following is a detailed description of the preferred embodiments of the invention, reference being made to the drawings in which the same reference numerals identify the same elements of structure in each of the several Figures.

Figure 2:
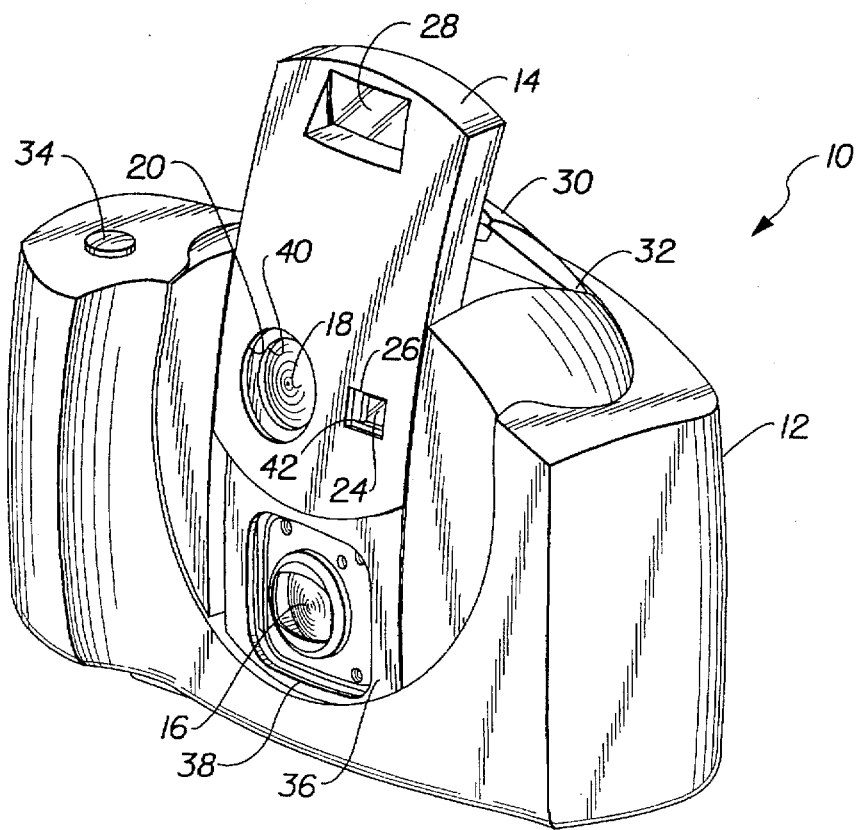
FIG. 2 shows the camera of FIG. 1 with the lens cover in an open position to reveal three parallel optical systems, plus a status display pivoted to a slanted, raised position.

FIGS. 1 and 2 show a front perspective view of a hybrid camera 10 incorporating a lens cover according to the invention. The camera comprises a housing 12 which supports or encloses various components. As will be described in greater detail later in this specification, a first lens cover or member 14 is slideable on a panel supported by housing 12 between a first, closed position shown in FIG. 1 and a second, open position shown in FIG. 2. As illustrated, cover 14 is slideable manually; however, those skilled in the art will appreciate that means could be provided for driving the cover between the first and second positions, such as a rack and pinion system driven by a motor, not illustrated. In any event, as can be seen in the open position, a first taking lens 16 for film photography is supported by housing 12 in position to focus light on photographic film disposed within the camera in a conventional manner, not illustrated. A second taking lens 18 for digital photography also is supported by housing 12 at a location above and to the left of lens 16, as viewed from the front of the camera, in a position to focus light on an electronic image capture device disposed within the camera in a conventional manner, not illustrated. Lenses 16 and 18 may be fixed focus lenses or may comprise elements of parallel zoom lens systems, not illustrated.

Lens cover 14 is pierced by a first aperture 20 which is sized and located to reveal lens 18 in the open position of FIG. 2. Behind aperture 20, a second lens cover 22 is movably or pivotably supported for movement between a third, closed position shown in FIG. 1 and a fourth, open position shown in FIG. 2. Also supported by housing 12 is an objective lens 24 of a conventional viewfinder. As viewed from the front of the camera, lens 24 is located above and to the right of lens 16, and to the right of lens 18. However, the lens cover of the invention can be configured readily to cover and uncover various arrangements of the three lenses. Lens cover 14 also is pierced by a second aperture 26 which is sized and located to reveal lens 24 in the open position of FIG. 2. Although the lens cover is illustrated as used in a hybrid camera having taking lenses 16 and 18 and viewfinder lens 24, those skilled in the camera art will appreciate that the lens cover also could be used in conventional film cameras or digital cameras in which lens cover 14 would cover and uncover the taking lens and lens cover 22 would cover and uncover the viewfinder lens, or vice versa.

Mounted at an upper end of lens cover 14 is an electronic flash unit 28 which, in the open position of the lens cover, is elevated above lenses 16 and 18 to reduce the familiar "red eye" effect in finished photographic prints. Since flash unit 28 is nearly centered above lenses 16 and 18, objects in a scene to be photographed will be illuminated essentially symmetrically. Behind lens cover 14, a status display panel 30 is pivotably supported at a rear end 32. Display panel 30 may comprise a liquid crystal display (LCD) which can be actuated by an internal controller of the camera, not illustrated, to indicate the status of various camera features. Conventional flexible circuit members, not illustrated, may be used to connect flash unit 28 and display panel 30 to a controller for the camera within housing 12, as will be understood by those skilled in camera art. As will be discussed in detail later in this description, movement of lens cover 14 to the open position causes display panel 30 to pivot about its rear end 32 from a lowered position shown in FIG. 1, to a raised position shown in FIG. 2, and vice versa. In the raised position, both the status display and an image display panel on the back of the camera can be viewed easily at the same time. An image capture button 34 is provided on an upper surface of housing 12 for actuation by a user to cause hybrid, film or digital image capture in ways familiar to those skilled in the camera art.

Figure 3:
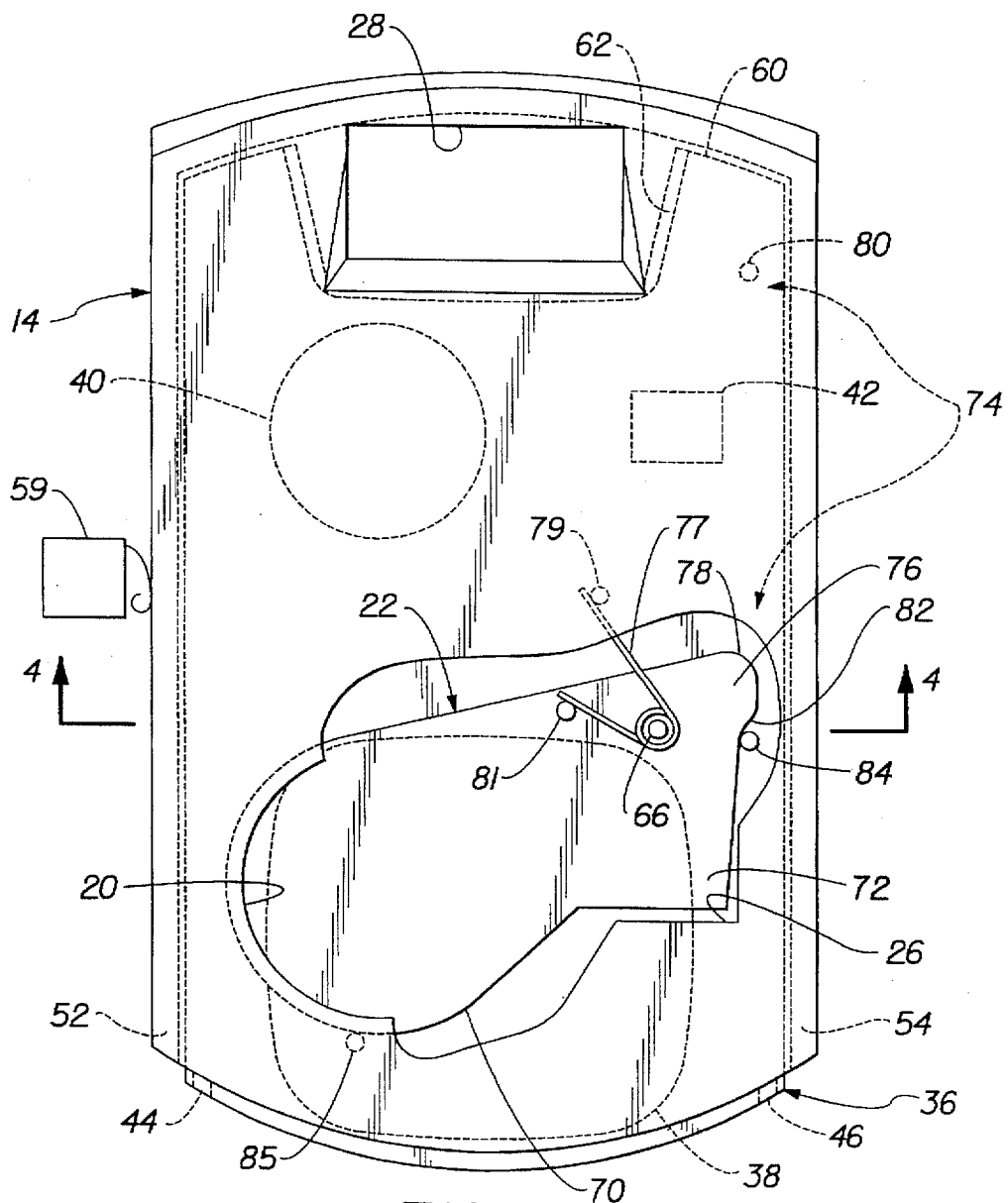
FIG. 3 shows an elevation view of the lens cover of FIGS. 1 and 2 in the closed position, a portion of the first lens cover being broken away to reveal details of the second lens cover.
Figure 4:
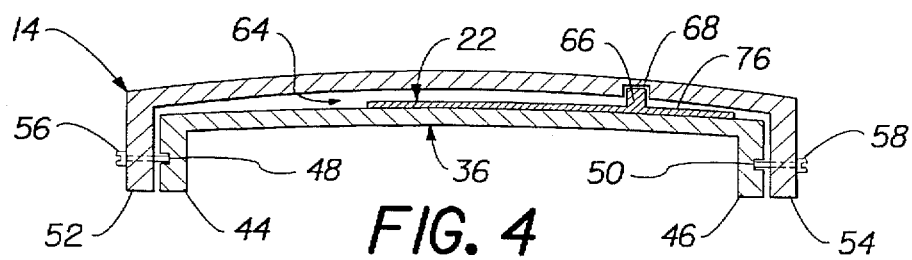
FIG. 4 shows a sectional view along line 4—4 of FIG. 3.
Figure 5:
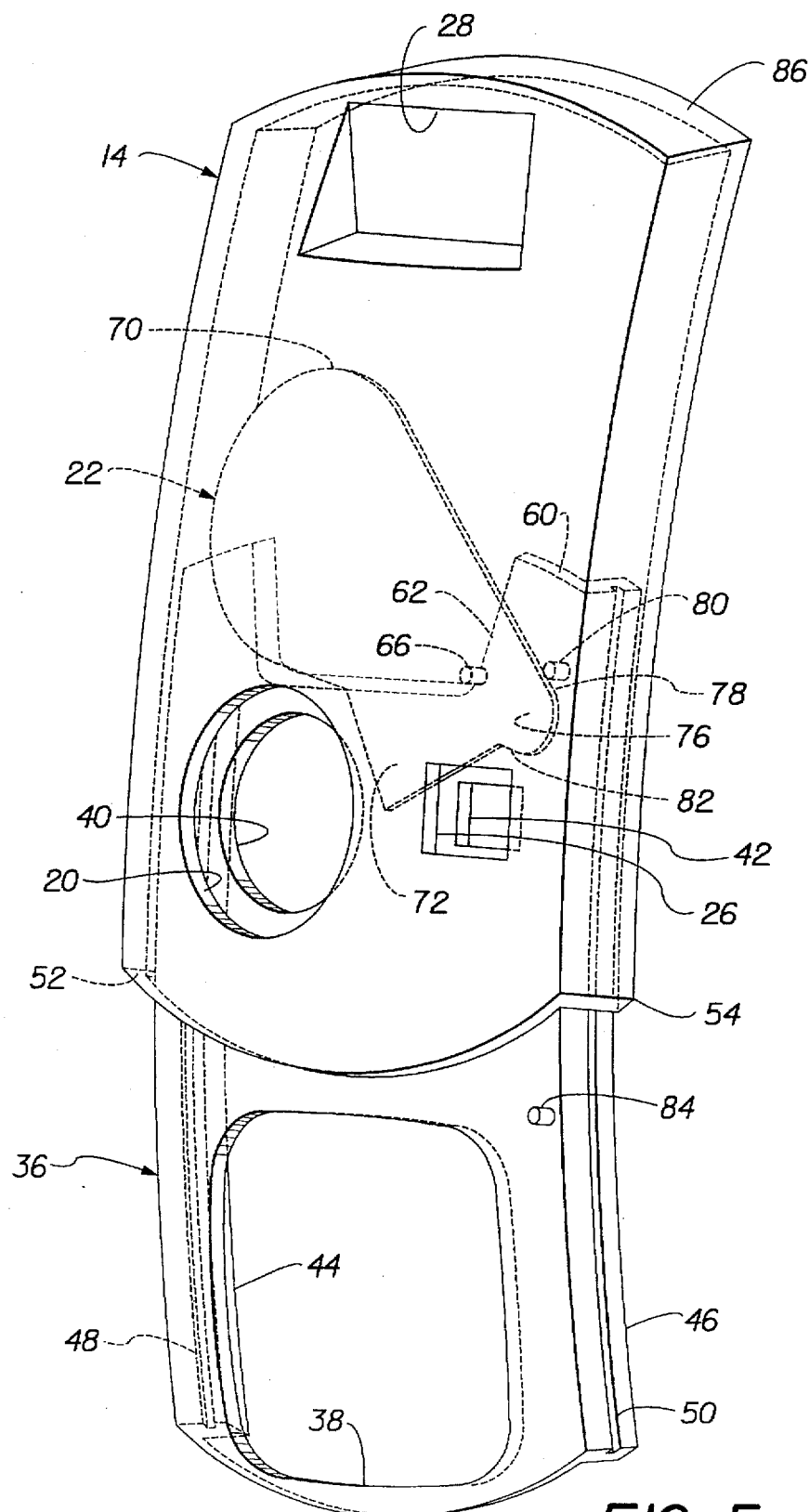
FIG. 5 shows a perspective view of the lens cover of FIGS. 3 and 4 in the open position.

FIGS. 3 to 5 show one embodiment of a lens cover according to the invention, with the components of the lens cover removed from a camera for ease of illustration. An elongated, essentially rectangular support panel 36 is pierced by an aperture 38 to reveal the lens system of lens 16. Panel 36 also is pierced by an aperture 40 to reveal the lens system of lens 18. Zoom lens systems, if used, would extend through apertures 38, 40 when the lens covers are open. Finally, as shown in FIG. 5, panel 36 is pierced by an aperture 42 to reveal lens 24. Although lens 24 preferably is positioned behind support panel 36 as shown, the viewfinder system also could be located just outside of the perimeter of lens cover 14. In such a case, a laterally extended tab, not illustrated, on lens cover 14 could be provided to cover lens 24 in the closed position.

Support panel 36 includes a pair of parallel, rearwardly extended support flanges 44, 46 having on their outer surfaces a pair of parallel grooves 48, 50. Panel 36 may be mounted to housing 12 in any convenient manner, not illustrated. Lens cover 14 includes a pair of parallel, rearwardly extended side flanges 52, 54 which are positioned outwardly of flanges 44, 46, as best seen in FIG. 4. To guide lens cover 14 between the closed and open positions, a plurality of pins or screws 56, 58 having unthreaded pilot tips may be inserted or threaded through side flanges 52, 54 to position the pins or pilot tips in grooves 48, 50. Stops, not illustrated, may be provided in grooves 48, 50 to limit upward and downward movement of lens cover 14. A limit switch 59 preferably is provided adjacent panel 36 within housing 12 to detect movement of cover 14 from the closed position of FIG. 3 to the open position of FIG. 5. When cover 14 reaches the position of FIG. 5, switch 59 will be actuated to signal an internal controller of the camera that the lens covers have been opened; the flash unit and status display have been raised; and the camera is ready for operation. An upper edge 60 of panel 36 includes a central notch 62 for receiving flash unit 28 in the closed position.

As shown in FIG. 4, a space 64 is provided between lens cover 14 and support panel 36 for ease of movement of lens cover 22 between the open and closed positions. As shown in FIGS. 3 to 5, lens cover 22 includes a pivot axle 66 which extends into a blind bore 68 in a rear surface of lens cover 14. To cover first aperture 20, lens cover 22 includes an essentially semicircular portion 70 radially spaced to the left of axle 66. An essentially triangular portion 72 also is included in lens cover 22 to cover second aperture 26 in the closed position, as shown in FIG. 3. To move lens cover 22 between the third, closed position and the fourth, open position as lens cover 14 moves between the first, closed position and the second, open position, a mechanism 74 is provided. Lens cover 22 includes an actuation flange 76 extended radially to the right of axle 66. A torsion spring 77 is mounted around pivot axle 66, with the ends of the spring engaged with a pin 79 on the under side of cover member 14 and a pin 81 extended outwardly from cover member 22. As lens cover 14 is moved upward by a user of the camera, a first engagement surface 78 on flange 76 eventually encounters a first, fixed abutment member or pin 80 which extends forward from support panel 36. Continued movement of lens cover 14 causes lens cover 22 to rotate clockwise against the bias of spring 77 to the fourth, open position of FIG. 5 in which apertures 20 and 40 are open to reveal lens 18, aperture 26 reveals lens 24, and aperture 38 reveals lens 16. As lens cover 14 is moved downward from pin 80 by the user, lens cover 22 will rotate counter-clockwise under the influence of spring 77 toward the third, closed position. Eventually, a second engagement surface 82 on flange 76 encounters a second, fixed abutment member or pin 84 which extends forward from support panel 36, thus stopping lens cover 22 in the third, closed position of FIG. 3. A fixed pin 85 is provided on the under side of lens cover 14 to limit rotation of cover member 22 under the influence of spring 77.

Figure 6:
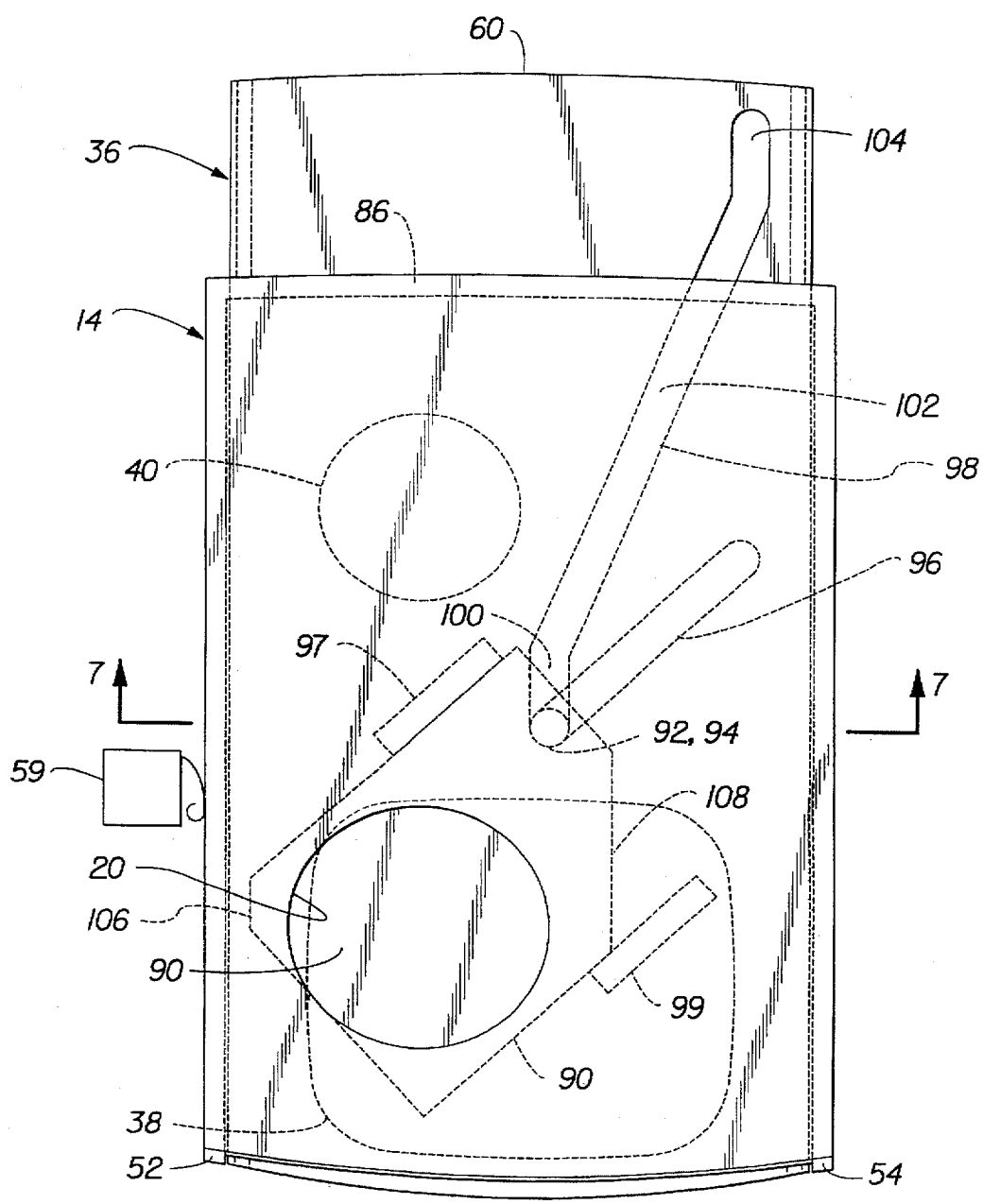
FIG. 6 shows an elevation view of an alternative embodiment of the lens cover in the closed position.
Figure 7:
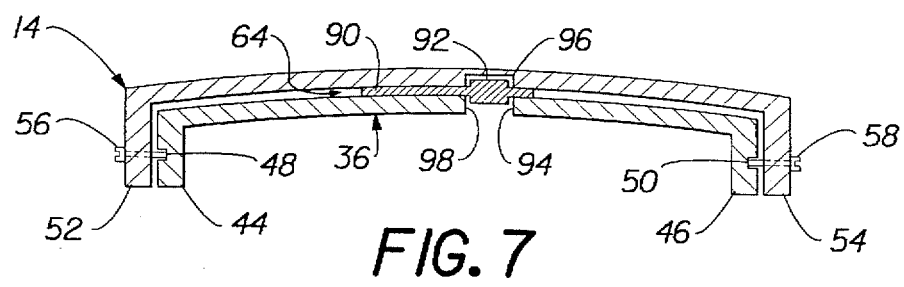
FIG. 7 shows a sectional view along line 7—7 of FIG. 6.
Figure 8:
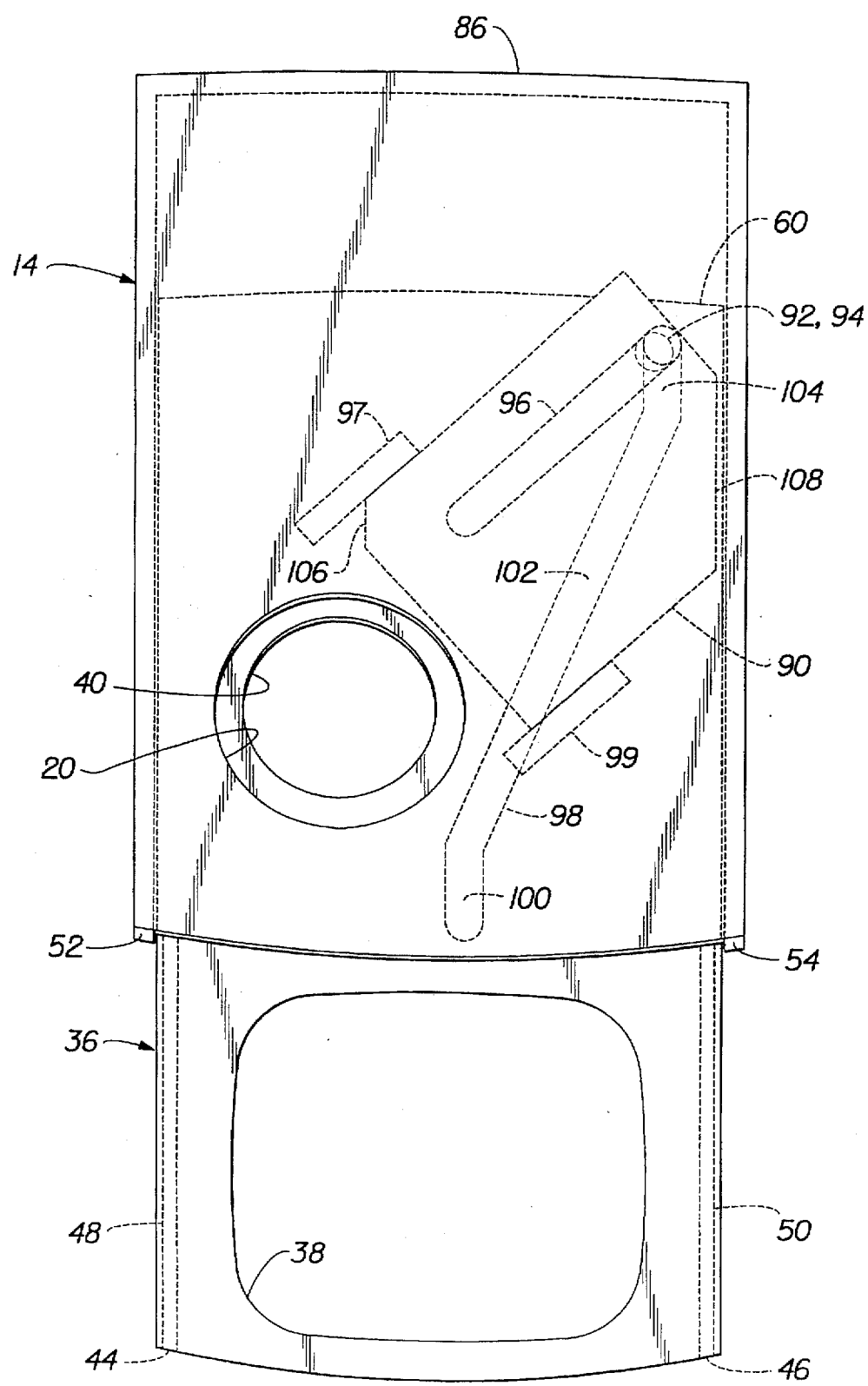
FIG. 8 shows an elevation view of the lens cover of FIGS. 6 and 7 in the open position.

FIGS. 6 to 8 disclose further embodiment of the combination of lens cover 14 and support panel 36, in which a modified second lens cover and actuating mechanism are provided. No aperture for the viewfinder is shown; however, those skilled in the art will understand that a similar provision could be made for lens 24 as in the embodiment of FIGS. 1 to 5, though the location of lens 24 would need to be shifted somewhat. In the further embodiment, a second lens cover 90 is provided with a first cam follower 92 which extends toward the front of lens cover 14 and a coaxial, second cam follower 94 which extends toward support panel 36. Cam follower 92 extends into a cam slot or member 96 formed in an underside of lens cover 14. Cam slot 96 extends at an acute angle to the direction of movement of lens cover 14. Cam follower 94 extends into a cam slot or member 98 formed in an upper side of support panel 36. A pair of parallel guide ribs 97, 99, shown in dashed lines, are provided on the back of lens cover 14 to keep cover 90 from rotating as it moves between open and closed positions.

Cam slot 98 includes a first portion 100 which extends parallel to the direction of movement of lens cover 14; a continuing second portion 102 which extends at an acute angle to the direction of movement of lens cover 14; and a continuing third portion 104 which extends parallel to the direction of movement. Parallel portions 100, 102 respectively help to hold cover 14 in the closed and open positions by increasing the angular divergence between cam slots 96 and 98 near the limits of movement of cover 14 and thereby increasing friction between the cam slots and cam followers. A flat surface 106 on a left edge of second lens cover 90 nearly contacts side flange 52 in the closed position of FIG. 6, while a parallel flat surface 108 on a right edge of second lens cover 90 nearly contacts side flange 54 in the open position of FIG. 8.

In operation of the embodiment of FIGS. 6 to 8, movement of lens cover 14 causes cam follower 92 to traverse along cam slot 96, without rotation of cover 90; and cam follower 94 to traverse cam slot 98. This causes second lens cover 90 to slide between ribs 97, 99 from the third position of FIG. 6 to the fourth position of FIG. 8, thereby uncovering aperture 40 and revealing lens 18.

Figure 9:
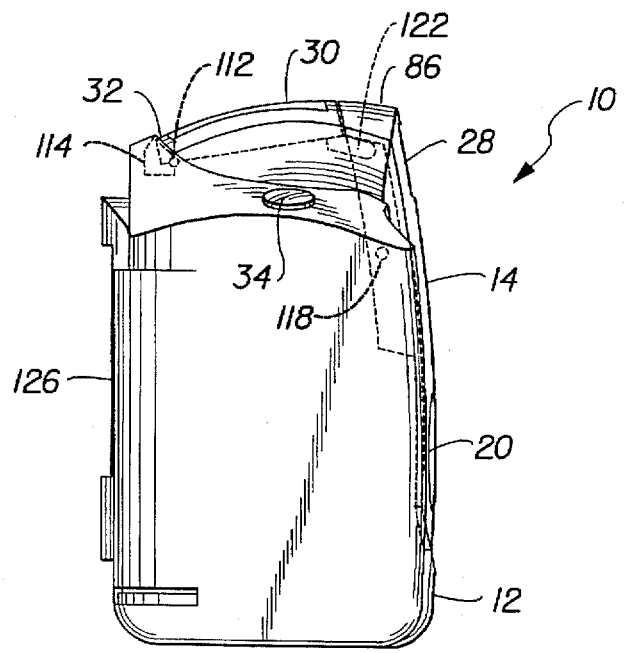
FIG. 9 shows a side view of the camera of FIG. 1, indicating in phantom lines certain details of the status display.
Figure 10:
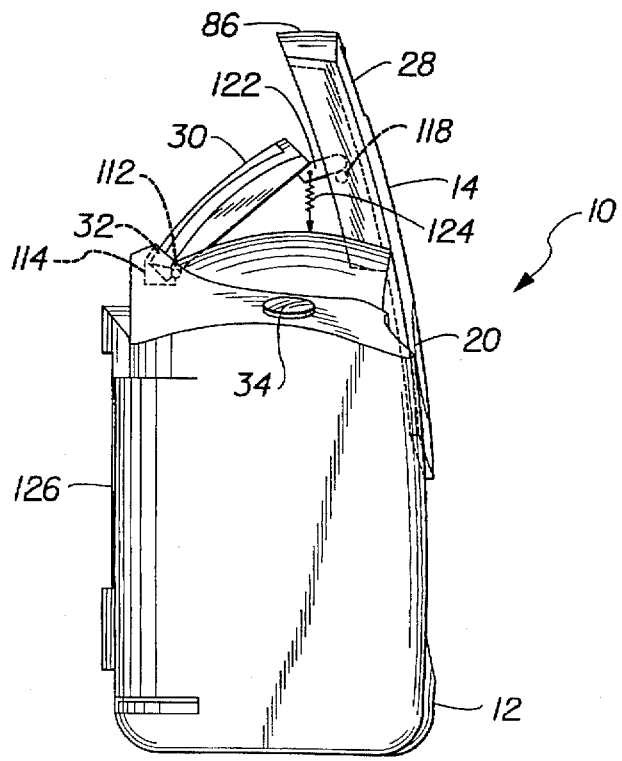
FIG. 10 shows the camera of FIG. 9 with the lens cover open and the status display pivoted to the slanted, raised position of FIG. 2.
Figure 11:
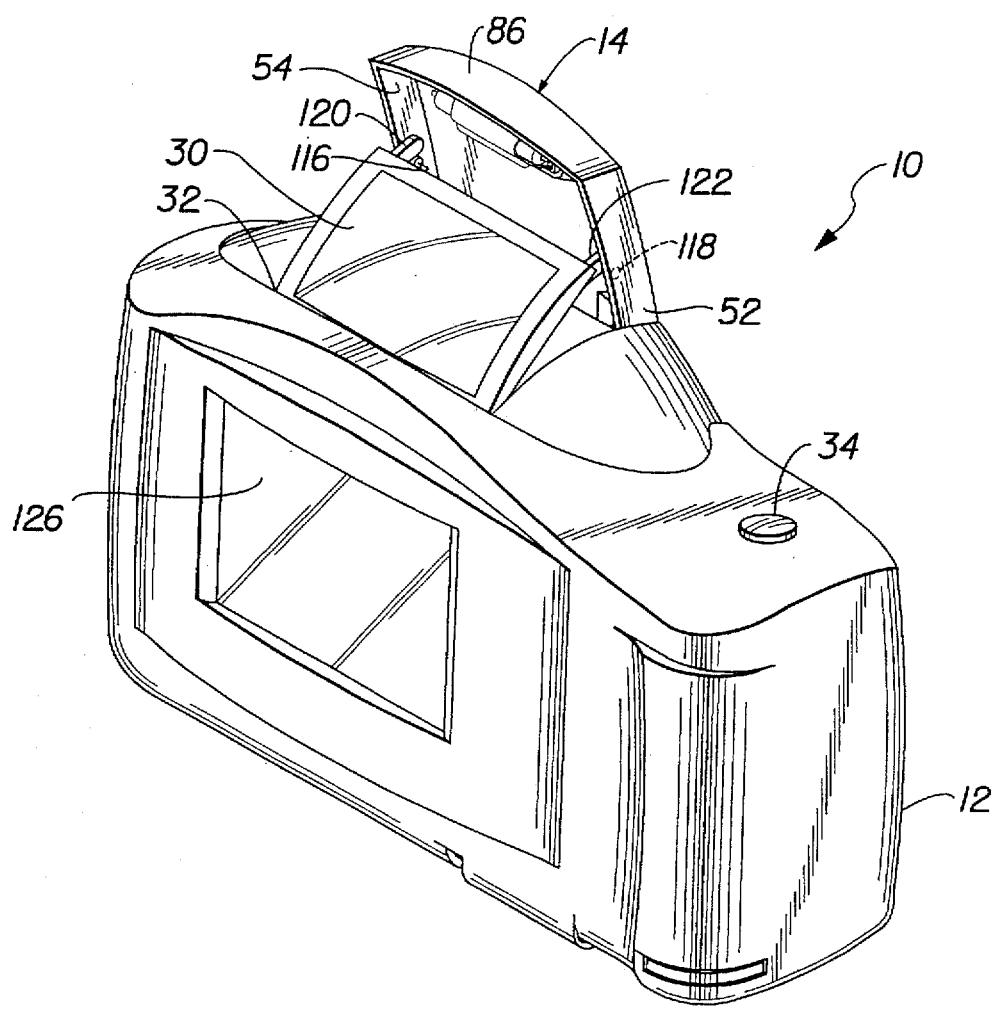
FIG. 11 shows a rear perspective view of the camera of FIGS. 2 and 10, indicating cooperating features of the status display and the lens cover and showing how the status display and the image display panels can be viewed at the same time.

FIGS. 9 to 11 show how display panel 30 is raised and lowered. At pivoted end 32, display panel 30 includes an essentially horizontal pivot or hinge 112. A recess 114 is provided in housing 12 to accommodate pivoted end 32 as the display is raised from the lowered position of FIGS. 1 and 9 to the raised position of FIGS. 2, 10 and 11. As shown in FIGS. 10 and 11, lens cover 14 is provided with a pair of essentially horizontal contact members 116, 118, such as short pins, which extend coaxially and horizontally inwardly from side flanges 52, 54. As cover 14 is raised and lowered, members 116, 118 may ride in grooves 48, 50 of support panel 36 or in a parallel set of grooves, not illustrated. A pair of extension members or fingers 120, 122 extend from a from end of display panel 30 in position to be engaged by pins 116, 118 as lens cover 14 is raised toward the position of FIGS. 2 and 11. A tension spring 124, shown schematically in FIG. 10, is provided to bias the display panel toward the lowered position and to maintain engagement between pins 116, 118 and extension members 120, 122 during raising and lowering of the display. When lens cover 14 and status display panel 30 are in the raised position, panel 30 also provides additional support for lens cover 40 and flash unit 28. A larger, image display panel 126 may be included on the back of camera 10 to show digital images captured using lens 18. Thus, when status display panel 30 is in the raised position of FIG. 11, panels 30 and 126 can be viewed easily at the same time.

Parts List

| | |
|---|---|
| 10 | hybrid camera |
| 12 | housing |
| 14 | first lens cover member |
| 16 | first taking lens for film photography |
| 18 | second taking lens for digital |
| 20 | first aperture in 14 |
| 22 | second lens cover member |
| 24 | objective lens for viewfinder |
| 26 | second aperture in 14 |
| 28 | flash unit on 14 |
| 30 | status display panel |
| 32 | pivoted end of 30 |
| 34 | image capture button |
| 36 | support panel for 14 |
| 38 | aperture in 36 for 16 |
| 40 | aperture in 36 for 18 |
| 42 | aperture in 36 for 24 |
| 44, 46 | rearwardly extended support flanges |
| 48, 50 | parallel grooves in 44, 46 |
| 52, 54 | rearwarly extended side flanges |
| 56, 58 | screws or pins |
| 59 | limit switch |
| 60 | upper edge of 36 |
| 62 | notch in 60 to receive 28 |
| 64 | space between 14 and 36 |
| 66 | pivot axle on 22 |
| 68 | bore in 14 |
| 72 | triangular portion of 22 |
| 74 | mechanism to move 22 |
| 76 | actuation flange |
| 77 | torsion spring |
| 78 | first engagement surface |
| 79 | pin |
| 80 | first abutment member on 36 |
| 81 | pin |

-continued

Parts List

| | |
|---|---|
| 82 | second engagement surface |
| 84 | second abutment member on 36 |
| 85 | pin |
| 86 | rearwardly extended top flange |
| 90 | alternative second lens cover member |
| 92 | cam follower |
| 94 | cam follower |
| 96 | cam member or slot in 14 for 92 |
| 97, 99 | guide ribs on back of 14 |
| 98 | cam member or slot in 36 for 94 |
| 100 | first portion of 98 |
| 102 | continuing second portion of 98 |
| 104 | continuing third portion of 98 |
| 106 | flat surface on 90 |
| 108 | flat surface on 90 |
| 112 | pivot for 32 |
| 114 | recess in 12 for 32 |
| 116, 118 | transverse contact members on 14 |
| 120, 122 | extension members on 30 |
| 124 | spring |
| 126 | electronic image display panel |

While our invention has been shown and described with reference to particular embodiments thereof, those skilled in the art will understand that other variations in form and detail may be made without departing from the scope and spirit of our invention.

Having thus described our invention in sufficient detail to enable those skilled in the art to make and use it, we claim as new and desire to secure Letters Patent for:

1. A hybrid camera, comprising:

a camera housing;

a first taking lens supported by the housing for film photography;

a second taking lens supported by the housing for digital photography;

a first lens cover supported by the housing for movement between a first position in which one of the first and second lenses is covered by the first lens cover and a second position in which the one lens is uncovered by the first lens cover;

a first aperture in the first lens cover for revealing the other of the first and second lenses in the second position;

a second lens cover supported by the first lens cover for movement between a third position in which the first aperture is covered by the second lens cover and a fourth position in which the first aperture is uncovered by the second lens cover to reveal the other lens in the second position; and a mechanism actuated by movement of the first lens cover to move the second lens cover between the third and fourth positions.

2. A hybrid camera according to claim 1, wherein the first lens cover moves vertically between the first and second positions, further comprising a flash unit supported by the first lens cover above the first and second taking lenses.

3. A hybrid camera according to claim 1, wherein the first lens cover uncovers the first taking lens in the second position and the second lens cover uncovers the second taking lens in the fourth position.

4. A hybrid camera according to claim 1, further comprising:

a camera status display panel pivotably supported by the housing for movement between a lowered position and a raised position; and a mechanism actuated by movement of the first lens cover to raise the display panel as the first lens cover moves to the second position and to lower the display panel as the first lens cover moves to the first position.

5. A hybrid camera according to claim 4, further comprising a spring for biasing the display panel toward the lowered position.

6. A hybrid camera according to claim 4, wherein the mechanism comprises a contact member supported by the first lens cover to slidably engage a portion of the display panel as the first lens cover moves between the first and second positions.

7. A hybrid camera according to claim 6, wherein the contact member comprises a pin extended transverse to a direction of movement of the first lens cover; and the portion of the display panel comprises an extension member which slidably engages the pin.

8. A hybrid camera according to claim 1, further comprising:
   an objective lens for a viewfinder supported by the housing, the objective lens being covered by the first lens cover in the first position; and
   a second aperture in the first lens cover for revealing the objective lens in the second position.

9. A hybrid camera according to claim 1, wherein the second lens cover also covers the second aperture in the third position and uncovers the second aperture in the fourth position.

10. A hybrid camera according to claim 1, wherein the mechanism to move the second lens cover comprises:
   a pivot supporting the second lens cover on the first lens cover;
   an engagement surface on the second lens cover spaced radially from the pivot; and
   an abutment member supported by the housing to contact the engagement surface as the first lens cover moves toward the second position, thereby causing the second lens cover to rotate about the pivot from the third position to the fourth position.

11. A hybrid camera according to claim 10, further comprising a further abutment member supported by the housing to contact the second lens cover when the first lens cover is in the first position and the second lens cover is in the third position.

12. A hybrid camera according to claim 1, wherein the mechanism to move the second lens cover comprises:
   a first cam member in the housing;
   a second cam member in the first lens cover;
   a first cam follower extended from the second lens cover into engagement with the first cam member; and
   a second cam follower extended from the second lens cover into engagement with the second cam member.

13. A hybrid camera according to claim 12, wherein the first and second cam members are slots along which the first and second cam followers move as the first lens cover moves between the first and second positions.

14. A hybrid camera according to claim 13, wherein:
   the first cam slot includes a first portion extended parallel to a direction of movement of the first lens cover, a continuing second portion extended at an acute angle to the direction of movement, and a continuing third portion extended parallel to the direction of movement; and
   the second cam slot is extended at an acute angle to the direction of movement.

15. A hybrid camera according to claim 14, wherein the first lens cover comprises stops for the second lens cover in the third and fourth positions.

16. A camera, comprising:
   a camera housing;
   a taking lens supported by the housing;
   an objective lens for a viewfinder supported by the housing;
   a first lens cover supported by the housing for movement between a first position in which one of the taking and objective lenses is covered by the first lens cover and a second position in which the one lens is uncovered by the first lens cover;
   an aperture in the first lens cover for revealing the other of the taking and objective lenses in the second position;
   a second lens cover supported by the first lens cover for movement between a third position in which the aperture is covered by the second lens cover and a fourth position in which the aperture is uncovered by the second lens cover to reveal the other lens in the second position; and
   a mechanism actuated by movement of the first lens cover to move the second lens cover between the third and fourth positions.

17. A camera according to claim 16, further comprising a flash unit supported by the first lens cover.

18. A camera according to claim 16, wherein the first lens cover uncovers the taking lens in the second position and the second lens cover uncovers the objective lens in the fourth position.

19. A camera according to claim 16, further comprising:
   a camera status display panel pivotably supported by the housing for movement between a lowered position and a raised position; and
   a mechanism actuated by movement of the first lens cover to raise the display panel as the first lens cover moves to the second position and to lower the display panel as the first lens cover moves to the first position.

20. A camera according to claim 19, further comprising a spring for biasing the display panel toward the lowered position.

21. A camera according to claim 19, wherein the mechanism comprises a contact member supported by the first lens cover to slidably engage a portion of the display panel as the first lens cover moves between the first and second positions.

22. A camera according to claim 21, wherein the contact member comprises a pin extended transverse to a direction of movement of the first lens cover; and the portion of the display panel comprises an extension member which slidably engages the pin.

23. A camera according to claim 16, wherein the mechanism to move the second lens cover comprises:
   a pivot supporting the second lens cover on the first lens cover;
   an engagement surface on the second lens cover spaced radially from the pivot; and
   an abutment member supported by the housing to contact the engagement surface as the first lens cover moves toward the second position, thereby causing the second lens cover to rotate about the pivot from the third position to the fourth position.

24. A camera according to claim 23, further comprising a further abutment member supported by the housing to contact the second lens cover when the first lens cover is in the first position and the second lens cover is in the third position.

25. A camera according to claim 16, wherein the mechanism to move the second lens cover comprises:
a first cam member in the housing;
a second cam member in the first lens cover;
a first cam follower extended from the second lens cover into engagement with the first cam member; and
a second cam follower extended from the second lens cover into engagement with the second cam member.

26. A camera according to claim 25, wherein the first and second cam members are slots along which the first and second cam followers move as the first lens cover moves between the first and second positions.

27. A camera according to claim 26, wherein:
the first cam slot includes a first portion extended parallel to a direction of movement of the first lens cover, a continuing second portion extended at an acute angle to the direction of movement, and a continuing third portion extended parallel to the direction of movement; and
the second cam slot is extended at an acute angle to the direction of movement.

28. A camera according to claim 27, wherein the first lens cover comprises stops for the second lens cover in the third and fourth positions.

29. A camera according to claim 16, wherein the taking lens is for digital photography.

30. A camera according to claim 16, wherein the taking lens is for film photography.

31. A camera, comprising:
a camera housing;
a taking lens supported by the housing;
a camera status display panel pivotably supported by the housing for movement between a lowered position and a raised position;
a member supported by the housing for movement between a first position and a second position; and
a mechanism actuated by movement of the member to raise the display panel as the member moves to the second position and to lower the display panel as the member moves to the first position.

32. A camera according to claim 31, further comprising a spring for biasing the display panel toward the lowered position.

33. A camera according to claim 31, wherein the mechanism comprises a contact member supported by the member to slidably engage a portion of the display panel as the member moves between the first and second positions.

34. A camera according to claim 33, wherein the contact member comprises a pin extended transverse to a direction of movement of the member; and the portion of the display panel comprises an extension member which slidably engages the pin.

35. A camera according to claim 31, further comprising an electronic image display panel supported on a back of the housing, whereby the status display panel in the raised position and the image display panel can be viewed at the same time.

36. A camera according to claim 35, wherein the member supported for movement comprises a lens cover for the taking lens.

* * * * *